July 17, 1928.
O. C. STAATS
1,677,737
RADIO TUNING DEVICE
Filed Feb. 6, 1926
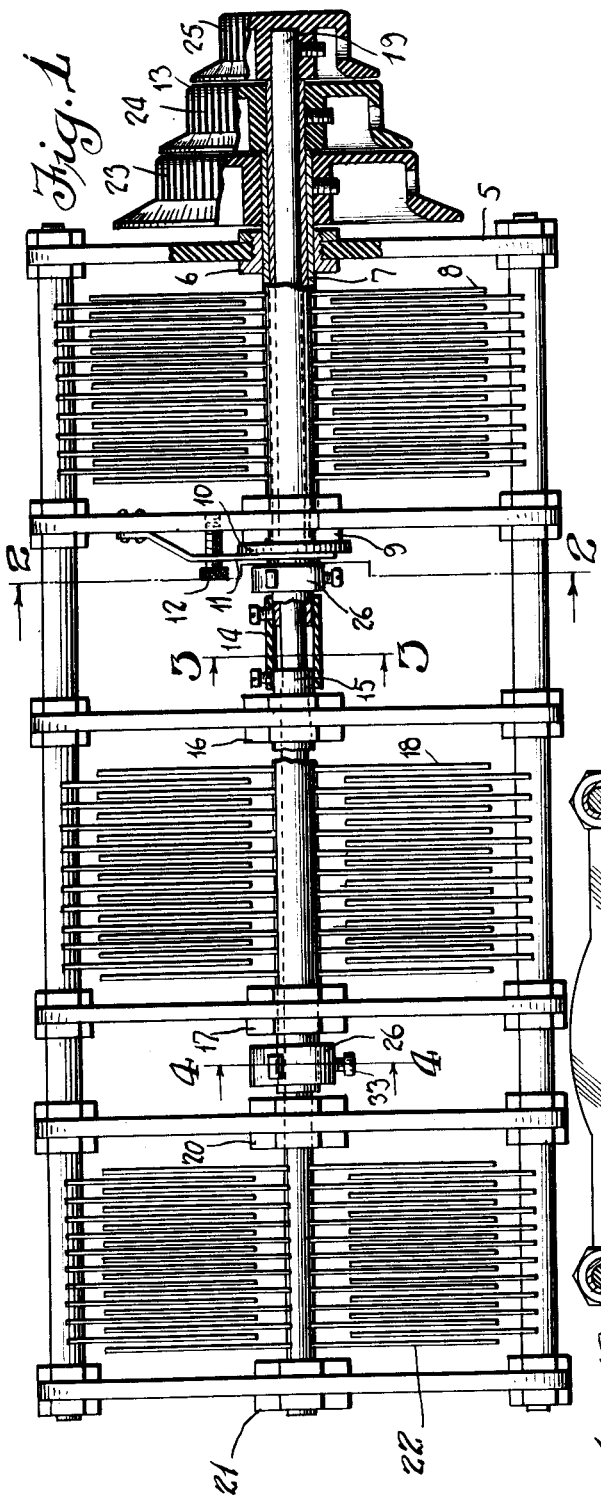
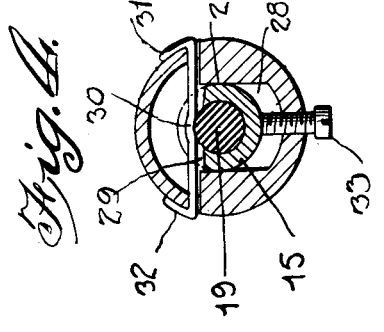
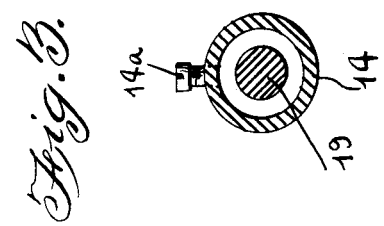
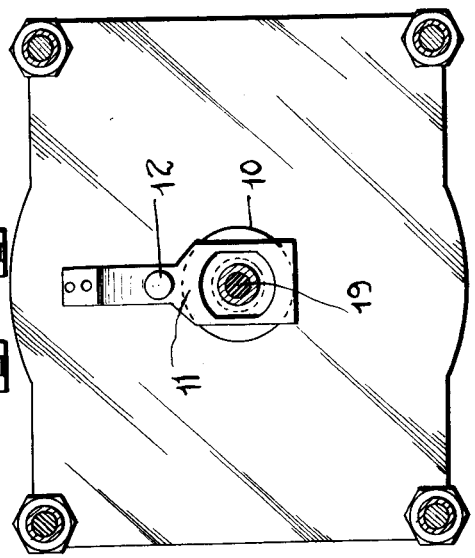
INVENTOR.
Oshel C. Staats
BY
ATTORNEYS.

Patented July 17, 1928.

1,677,737

UNITED STATES PATENT OFFICE.

OSHEL C. STAATS, OF RIPLEY, WEST VIRGINIA.

RADIO TUNING DEVICE.

Application filed February 6, 1926. Serial No. 86,564.

This invention has reference to controls for condensers or tuning devices on radio apparatus, and has for an object the provision of novel means, whereby two or more condensers may be operated simultaneously or selectively in a single shaft journal, through which the shafts on which the condensers are mounted project, one shaft within the other, in order that one shaft when rotated may carry the other shaft or shafts, the arrangement being such that the other shaft or shafts may be independently actuated for moving the condenser or condensers mounted on them.
It is a further object of this invention to produce novel means for coupling the shafts together by yieldable means which will permit the shafts to be rotated in unison or independently, as the requirements in practice may develop; and it is a still further object of this invention to provide a brake or friction device which will serve to retain the shafts in adjusted positions.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—
Figure 1 illustrates a view in elevation partly in section of a plurality of condensers mounted for operation, embodying the invention;

Figure 2 illustrates a sectional view on the line 2—2 of Fig. 1;

Figure 3 illustrates a sectional view of the device on the line 3—3 of Fig. 1, omitting parts beyond the coupling; and Figure 4 illustrates a sectional view on the line 4—4 of Fig. 1.

In these drawings, a suitable frame is provided for holding the stationary condenser plates and the bearings for the shafts, and the frame has a front plate 5 with a bearing 6, in which an outer tubular shaft 7 is rotatable, the said outer shaft constituting a carrier or support for the movable condenser plates 8. The shaft 7 also extends through a bearing 9 and it carries a collar 10 which is engaged by a spring 11 anchored to the frame, which spring is intended to produce friction for retaining the parts in adjusted positions. The pressure of the spring on the collar may be regulated by a screw 12 threaded in the said spring and bearing against one of the frame members.

A tubular shaft 13 is rotatable in the shaft 7 and it projects outwardly beyond the end of the shaft 7 and inwardly beyond the end of the said shaft 7. An insulating coupling 14 is secured by a set screw 14ª to the inner end of the shaft 13 and to an extension 15 of said shaft which is also tubular and which is rotatable in bearings 16 and 17 of the frame. The tubular extension 15 constitutes a support for the movable condenser plates 18 which are adapted to coact with a plurality of stationary condenser plates of known construction. As illustrated, in the present embodiment of the invention, a shaft 19 is rotatable in the shaft 13 and its extension 15 and through the insulating coupling 14, the said shaft 19 being additionally journaled in bearings 20 and 21 of the frame, and the said shaft constitutes a support and carrier for condenser plates 22 which coact with stationary condenser plates of conventional type.

The shafts 7, 13 and 19 have knobs or operating devices and preferably dials 23, 24 and 25, respectively, which permit manipulation of the shafts in the usual tuning operation, but the shafts are coupled to rotate selectively or in unison, as will be presently explained. The shafts 7 and 13 are frictionally connected together through means of a coupling 26, and the shaft extension 15 and the shaft 19 are frictionally connected together by a similar coupling. The couplings 26 comprise circular housings each having a web 27 therein, provided with a slot 28 of approximately the diameter of the shaft on which it is mounted, and for the purpose of this illustration, we will regard the coupling shown in Fig. 4 as being mounted on the extension 15 of the extension 15 of the shaft 13 with the shaft 19 extending through it. The tubular shaft is cut away to form a clearance or recess 29 in which a spring 30 is seated, which spring bears against the shaft 19, and the theory of operation is that the spring shall be of sufficient strength to produce friction which will couple the shafts together so that they will rotate in unison. The spring 30 is shown as having its ends 31 and 32 anchored in the coupling and it is intended to bear against the shaft 19, as stated. The coupling is anchored to the extension 15 by a set screw 33 so that the coupling rotates with the shaft.

In the operation of the device, the friction on the different shafts can be so regulated that when the first large knob 23 and dial on the outer hollow shaft is rotated for tuning the first condenser, the second and third knobs and dials 24 and 25, respectively, and their shafts will also rotate, thus operating the condensers simultaneously. Additionally, an operator may turn the second knob 24 with its shaft, which will serve to also rotate the knob 25 and its shaft 19 without moving the first dial or condenser, and thereafter, the operator may rotate the knob and dial 25 for independently rotating the shaft 19 with its condenser, while the first and second condensers remain stationary. It will be apparent that such manipulation will result in tuning all of the condensers simultaneously, or they may be tuned selectively, and while the invention has been described in association with three condensers, the number may be increased or diminished to suit particular requirements.

Of course suitable insulation will be supplied between the condensers and this may be accomplished by the employment of the insulated shaft 19, or the use of insulated joints, as those skilled in the art will understand.

I claim:

1. In a radio tuning device, a frame, sets of condenser elements carried thereon, a hollow shaft rotatable through a zone of the frame having one set of condenser elements, condenser elements carried on the said shaft and adapted to coact with the condenser elements in the said zone, a hollow shaft within the first mentioned shaft extending beyond each end of said shaft, means yieldingly connecting the shafts for rotation in unison, the second mentioned shaft carrying condenser elements for a succeeding zone, a shaft within the second mentioned shaft extending beyond its ends, condenser elements carried by the inner shaft to coact with the condenser elements of another zone, means for yieldingly coupling the first mentioned and second mentioned shafts together, means for yieldingly coupling the inner shaft to the intermediate shaft, and separate hand grasps for the shafts whereby they may be manipulated simultaneously or selectively.

2. In a radio tuning device, a frame, sets of condenser elements carried thereon, a hollow shaft rotatable through a zone of the frame having one set of condenser elements, condenser elements carried on the said shaft and adapted to coact with the condenser elements in the said zone, a hollow shaft within the first mentioned shaft extending beyond each end of said shaft, means yieldingly connecting the shafts for rotation in unison, the second mentioned shaft carrying condenser elements for a succeeding zone, a shaft within the second mentioned shaft extending beyond its ends, condenser elements carried by the inner shaft to coact with the condenser elements of another zone, means for yieldingly coupling the first mentioned and second mentioned shafts together, means for yieldingly coupling the inner shaft to the intermediate shaft, separate hand grasps for the shafts whereby they may be manipulated simultaneously or selectively, and a friction device for restricting the movement of the first mentioned shaft.

OSHEL C. STAATS.